United States Patent
Hassel et al.

(10) Patent No.: US 10,109,025 B2
(45) Date of Patent: Oct. 23, 2018

(54) METHOD FOR CONTROLLING A TECHNICAL APPARATUS

(75) Inventors: Jörg Hassel, Erlangen (DE); Frank Konopka, Altdorf (DE)

(73) Assignee: Siemens Aktiengesellschaft, Munich (DE)

( * ) Notice: Subject to any disclaimer, the term of this patent is extended or adjusted under 35 U.S.C. 154(b) by 550 days.

(21) Appl. No.: 14/114,061

(22) PCT Filed: Jun. 21, 2011

(86) PCT No.: PCT/EP2011/060333
§ 371 (c)(1),
(2), (4) Date: Dec. 11, 2013

(87) PCT Pub. No.: WO2012/175114
PCT Pub. Date: Dec. 27, 2012

(65) Prior Publication Data
US 2014/0114488 A1  Apr. 24, 2014

(51) Int. Cl.
*G06F 19/00* (2018.01)
*G06Q 50/06* (2012.01)
*G05B 19/042* (2006.01)

(52) U.S. Cl.
CPC ......... *G06Q 50/06* (2013.01); *G05B 19/0426* (2013.01); *G05B 2219/25289* (2013.01)

(58) Field of Classification Search
CPC ...... G05B 19/0426; G05B 2219/25289; G06Q 50/06
See application file for complete search history.

(56) References Cited

U.S. PATENT DOCUMENTS

| 8,239,073 B2 * | 8/2012 | Fausak | G01D 4/002 700/276 |
| 2010/0025483 A1 | 2/2010 | Hoeynck et al. | |
| 2010/0088261 A1 * | 4/2010 | Montalvo | H02J 3/14 700/297 |
| 2011/0172838 A1 * | 7/2011 | Pai | G05B 15/02 700/292 |
| 2012/0004783 A1 * | 1/2012 | Lo | H02J 3/14 700/291 |

(Continued)

FOREIGN PATENT DOCUMENTS

| CN | 101251291 | 8/2008 |
| CN | 201547914 | 8/2010 |

(Continued)

OTHER PUBLICATIONS

Agarwal, Yuvraj, Thomas Weng, and Rajesh K. Gupta. "The energy dashboard: improving the visibility of energy consumption at a campus-wide scale." Proceedings of the First ACM Workshop on Embedded Sensing Systems for Energy-Efficiency in Buildings. ACM, 2009.*

(Continued)

*Primary Examiner* — Michael D Masinick
(74) *Attorney, Agent, or Firm* — Cozen O'Connor

(57) ABSTRACT

The invention relates to a method for controlling a technical apparatus in which a time profile (E(t)) for a power requirement (E) for the technical apparatus is ascertained over at least one period and an operating state of the technical apparatus is matched to the ascertained power requirement (E) on the basis of time.

9 Claims, 2 Drawing Sheets

(56) References Cited

U.S. PATENT DOCUMENTS

2012/0323384 A1* 12/2012 Park ................... H04L 12/2803
700/286

FOREIGN PATENT DOCUMENTS

| CN | 101968250 | 2/2011 |
| CN | 102052734 | 5/2011 |
| EP | 2 081 097 | 7/2009 |

OTHER PUBLICATIONS

Berndt, Ernst R. "Aggregate energy, efficiency, and productivity measurement." Annual Review of Energy 3.1 (1978): 225-273.*

* cited by examiner

METHOD FOR CONTROLLING A TECHNICAL APPARATUS

REFERENCE TO RELATED APPLICATIONS

This is a U.S. national stage of application No. PCT/EP2011/060333 filed 21 Jun. 2011.

BACKGROUND OF THE INVENTION

1. Field of the Invention

The invention relates to a method for controlling a technical apparatus.

2. Description of the Related Art

Because of a potentially required demand, many technical apparatuses presently run permanently in a full-load operation, examples being air conditioning systems, hydraulic systems, air supply or extraction apparatuses.

SUMMARY OF THE INVENTION

It is an object of the invention to provide an improved method for controlling a technical apparatus.

This and other objects are achieved in accordance with the invention by providing a method for controlling a technical apparatus, in which a time profile of an energy demand of the technical apparatus is determined from at least one period, and an operating state of the technical apparatus is adapted to the determined energy demand as a function of time.

The method enables the time-dependent adaptation of the operating state of a technical apparatus to its actual energy demand. The determination of a time profile of the energy demand in this case enables, in particular, the detection of regular patterns in the time profile of the energy demand, and corresponding control of the operating state. This increases the energy efficiency of the operation of the technical apparatus and thereby reduces the operating costs, in particular. Furthermore, as a rule, the method also lengthens the service life of the technical apparatus by slowing down its rate of wear.

In a preferred embodiment of the method, one or more energy demand intervals are prescribed and respectively assigned a specific operating state of the technical apparatus. The determined time profile of the energy demand is used to determine regularly recurring time intervals in which the determined energy demand is respectively permanently within a prescribed energy demand interval. At the beginning of such a time interval, the technical apparatus is then respectively automatically put into that operating state which is assigned to the respective energy demand interval.

Here, an energy demand interval is understood as an interval of the energy demand that is limited at least at one end. In particular, an energy demand interval can thus also be unlimited at one end. The interval limits of the energy demand interval supply threshold values of the energy demand. Via the assignment of operating states of the technical apparatus to the energy demand intervals, these threshold values in turn supply threshold values for changes in the operating state when two energy demand intervals abut one another. In this case, an energy demand interval unlimited at one end defines at most one threshold value by its single interval limit.

The presently contemplated embodiment advantageously enables a systematic and automated application of the method in accordance with the invention. Here, the assignment of operating states to energy demand intervals serves to define the operating states adapted to the respective energy demand.

The determination of regularly recurring time intervals in which the determined energy demand is respectively permanently within a prescribed energy demand interval advantageously enables recognition of regular structures in the determined time profile of the energy demand, and setting of the operation of the technical apparatus to the detected regular structures so that the operating state of the technical apparatus is respectively adapted to the corresponding energy demand in the determined regularly recurring time intervals. Typical examples of such regularly recurring time intervals are times in which the technical apparatus is not being used or is being operated at reduced power, such as at weekends or on night shifts, in which no work is being performed, or regularly recurring maintenance shifts.

In this embodiment, an energy-saving operation of the technical apparatus is preferably assigned at least to one energy demand interval as the operating state. The energy-saving operation is, for example, a sleep mode or rest mode of the technical apparatus.

The technical apparatus can thereby be automatically put into an energy-saving operating state when the energy demand is correspondingly low. The energy consumption and the operating costs of the technical apparatus are thereby lowered particularly advantageously.

Furthermore, a shutdown state of the technical apparatus is preferably assigned at least to one energy demand interval as the operating state.

The technical apparatus can thereby be shut down completely automatically when it is not required. This leads to a further advantageous lowering of energy consumption and operating costs of the technical apparatus.

In a further additional or alternative embodiment of the method, an operating state to be set is assigned at least to one event. Furthermore, it is monitored whether this event occurs and, upon the occurrence of the event, the technical apparatus is automatically put into the operating state assigned to the event.

In this way, the operating state of the technical apparatus can be automatically varied upon the occurrence of specific events. It is thereby advantageously possible to react to events that require a change in the operating state, such as "waking up" the technical apparatus from an energy-saving operation in the event of an increasing energy demand, or events that enable an advantageous change in the operating state, such as placing the technical apparatus into an energy-saving operation upon a lowering of the energy demand.

By way of example, such an event can be a varying energy consumption of a device connected to the technical apparatus.

It is advantageous in this case to recognize the fact that a varying energy consumption of a connected device can be an indicator of a change in energy demand of the technical apparatus that renders necessary a corresponding change in the operating state of the technical apparatus.

An event within the meaning of the second embodiment of the method can, furthermore, be a prescribed signal which is transmitted via a communication system, such as via a data bus, to which the technical apparatus is connected, or via a data network to which the technical apparatus is connected.

It is advantageous in this case to recognize the fact that it is possible to transmit via a communication system signals that can signal a change in energy demand of the technical apparatus. By way of example, such signals can originate from a control system or from other apparatuses, and serve, for example, as a trigger to start up the technical apparatus or to wake up the technical apparatus from an energy-saving operation.

An event within the meaning of the second embodiment can, moreover, be an energy consumption of the technical apparatus that is constant over a prescribed duration.

It is advantageous in this case to recognize the fact that an energy consumption of the technical apparatus that is constant over a lengthy duration can signal a corresponding energy demand and therefore suggest that the technical apparatus be placed into an operating state corresponding to this energy demand. By way of example, when the technical apparatus is a motor or frequency converter, it can in this way be automatically put into an energy-saving operation when it has not been operated for a length of time.

An event within the meaning of the embodiment refinement can also be a manually prescribed instant.

The technical apparatus can thereby advantageously be automatically placed into specific operating states at specific instants. By way of example, such an instant can be the beginning of a work holiday, and the technical apparatus can be shut down automatically at the beginning of the work holiday.

Depending on the respective event, the latter is, for example, assigned an energy-saving operation or a shut-down state or a start-up state of the technical apparatus as the operating state to be set. It is thereby possible to differentiate the respective event and react to the latter correspondingly.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The above described characteristics, features and advantages of this invention, and the way in which the said are achieved become more clear and more clearly comprehensible in conjunction with the following description of an exemplary embodiment which is explained in more detail in conjunction with a drawing, in which.

DETAILED DESCRIPTION OF THE PREFERRED EMBODIMENTS

As for the technical apparatus, it can, by way of example, in this case be a pump, for example a coolant or hydraulic pump, or a compressor. The specific type and design of the technical apparatus is in fact, however, largely irrelevant in terms of the inventive method. However, the method enjoys particularly advantageous applications to slave apparatuses of larger technical systems because, in contrast to the larger systems, the slave apparatuses are frequently operated permanently in an unchanged operating state with a view to permanent availability, i.e., they are not shut down nor are they put into an energy-saving operation.

Figure 1:
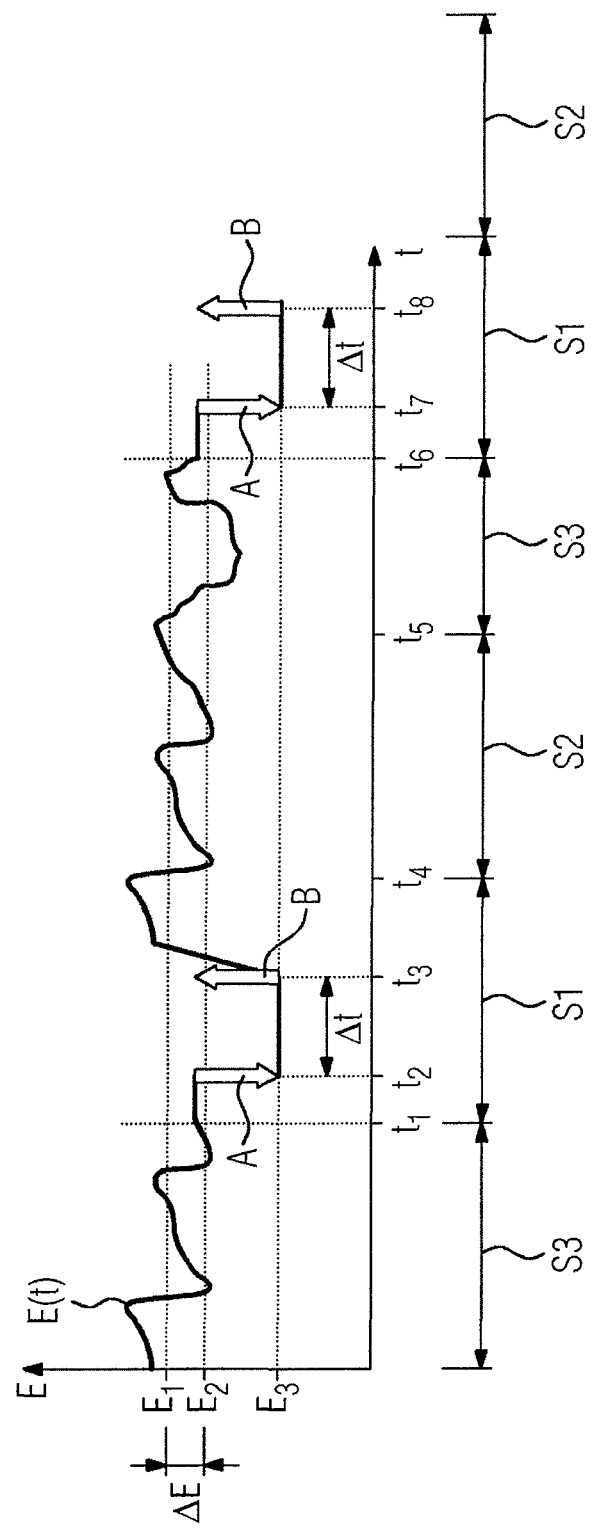
FIG. 1 shows a graphical plot of a time profile of an energy demand of a technical apparatus, and time intervals of an energy-saving operation of the technical apparatus.

FIG. 1 shows a time profile E(t) of an energy demand E of the technical apparatus as a function of time t during three consecutive days.

There is also illustrated a corresponding shift pattern of work shifts S1, S2, S3 in a plant in which the technical apparatus is used. In this case, S1 denotes a night shift, S2 an early shift and S3 a late shift.

On a first day, the late shift S3 ends at a first instant $t_1$, at which the night shift S1 following thereupon begins. This night shift S1 is followed at a fourth instant $t_4$ by the early shift S2 of a second day. This early shift S2 is followed at a fifth instant $t_5$ by the late shift S3 of the second day, whereupon a night shift S1 then follows again at a sixth instant $t_6$, and so on.

During the early shifts S2 and the late shifts S3, the energy demand E fluctuates as a function of time t as a consequence of the changing requirements placed on the technical apparatus. In particular, during the early shifts S2 and the late shifts S3, the energy demand E, respectively repeatedly leaves an energy demand interval ΔE that is limited by a first interval limit $E_1$ and a second interval limit $E_2$.

During the night shifts S1, the energy demand E of the technical apparatus is constant, because the technical apparatus is then not being used. Consequently, during the night shifts S1, in accordance with the invention the technical apparatus is automatically placed by a first operating state change A into an energy-saving operation in which the energy demand E sinks to a minimum demand $E_3$. Before the end of each night shift S1, the technical apparatus is "woken up" from the energy-saving operation by a second operating state change B such that it is once again fully ready for operation. Its energy demand E is thereby raised again. The second operating state change B can be initiated automatically or manually in this case. Likewise, the instants $t_3$, $t_8$ at which the second operating state change B is respectively undertaken can be determined automatically or manually.

In accordance with the invention, the energy-saving option is detected in this case during the night shifts S1 by determining and evaluating a time profile E(t) of the energy demand E of the technical apparatus over a period of several days. For the purpose of the evaluation, the energy demand interval ΔE is prescribed, and it is assigned the energy-saving operation as the operating state of the technical apparatus. It is detected in the evaluation that the energy demand E is always within the energy demand interval ΔE during a regularly recurring time interval Δt in the night shifts S1. It may concluded therefrom that the technical apparatus can be placed into the energy-saving operation during this time interval Δt. Consequently, the technical apparatus is respectively placed into the energy-saving mode at instants $t_2$, $t_7$ at the beginning of the time interval Δt.

Although the invention has been illustrated and described in more detail by a preferred exemplary embodiment, the invention is not restricted by the disclosed examples, and other variations can be derived herefrom by the person skilled in the art without departing from the protective scope of the invention.

Figure 2:
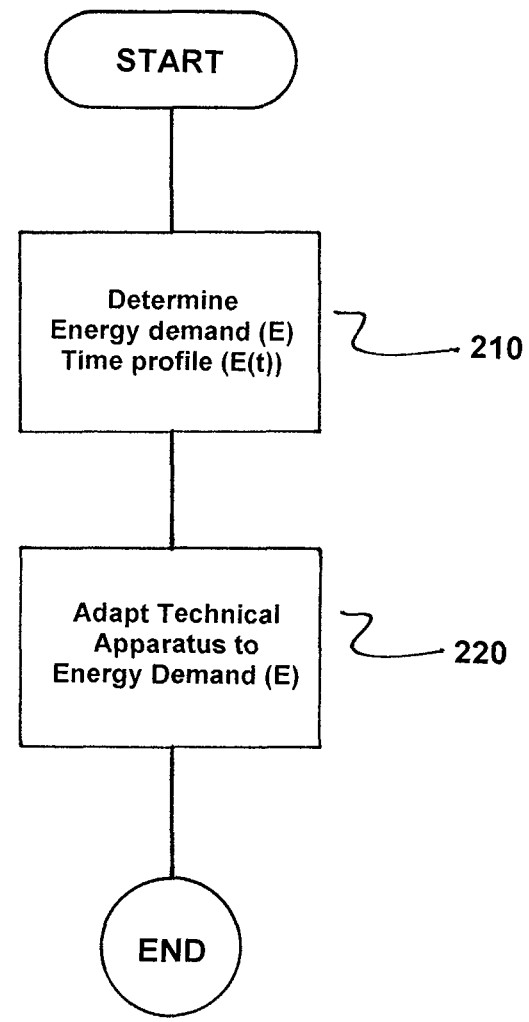
FIG. 2 is a flowchart of the method in accordance with the invention.

FIG. 2 is a flowchart of a method for controlling a technical apparatus. The method comprises determining a time profile (E(t)) of an energy demand (E) of the technical apparatus from at least one period, as indicated in step 210. Next, an operating state of the technical apparatus is adapted to the determined energy demand (E) as a function of time, as indicated in step 220.

While there have been shown, described, and pointed out fundamental novel features of the invention as applied to a preferred embodiment thereof, it will be understood that various omissions and substitutions and changes in the form and details of the methods described and illustrated, and in their operation, may be made by those skilled in the art without departing from the spirit of the invention. For example, it is expressly intended that all combinations of those method steps which perform substantially the same function in substantially the same way to achieve the same results are within the scope of the invention. Moreover, it should be recognized that method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for controlling a technical apparatus operating within a manufacturing plant, comprising:
    determining a time profile (E(t)) of an energy demand (E) of the technical apparatus operating within the manufacturing plant as a function of time from at least one time period, the time profile (E(t)) of the energy demand (E) comprising an energy usage fluctuation over a specific period of time during which the technical apparatus is in operation;
    adapting an operating state of the technical apparatus operating within the manufacturing plant to the determined energy demand (E) as the function of time;
    establishing an energy demand interval (ΔE) and assigning a specific operating state of the technical apparatus operating within the manufacturing plant during the energy demand interval (ΔE);
    determining at least one regularly recurring time interval (Δt) in which the determined energy demand (E) is permanently within the prescribed energy demand interval (ΔE); and
    automatically placing the technical apparatus operating within the manufacturing plant into that operating state which is assigned to the respective energy demand interval (ΔE) at a beginning of the time interval (Δt).

2. The method as claimed in claim 1, wherein an energy-saving operation of the technical apparatus operating within the manufacturing plant is assigned to the energy demand interval (ΔE) as the operating state.

3. The method as claimed in claim 1, wherein a shutdown state of the technical apparatus operating within the manufacturing plant is assigned to the energy demand interval (ΔE) as the operating state.

4. The method as claimed in claim 1, further comprising:
    assigning an operating state to be set to an event;
    monitoring whether the event occurs; and
    automatically placing the technical apparatus operating within the manufacturing plant into the operating state assigned to the event upon the occurrence of the event.

5. The method as claimed in claim 4, wherein the event is a varying energy consumption of a device connected to the technical apparatus operating within the manufacturing plant.

6. The method as claimed in claim 4, wherein the event is reception of a prescribed signal which is transmitted via a communication system.

7. The method as claimed in claim 4, wherein the event is an energy consumption of the technical apparatus operating within the manufacturing plant that is constant over a prescribed duration.

8. The method as claimed in claim 4, wherein the event is assigned an energy-saving operation or a shutdown state of the technical apparatus operating within the manufacturing plant as the operating state to be set.

9. The method as claimed in claim 4, wherein the event is assigned a shutdown state operating within the technical apparatus of the manufacturing plant as the operating state to be set.

* * * * *